Patented Aug. 8, 1933

1,921,326

UNITED STATES PATENT OFFICE 1,921,326

PROCESS OF MODIFYING VINYL RESINS

Foster Robertson, Pittsburgh, Pa., assignor to Carbide and Carbon Chemicals Corporation, a Corporation of New York No Drawing. Application September 11, 1930
Serial No. 481,339

4 Claims. (Cl. 260—2)

Many vinyl compounds can be caused to polymerize and form resins. The polymerization is conveniently carried out by dissolving the vinyl compound in an appropriate solvent, and then heating the solution, or subjecting it to ultraviolet radiation, or catalyzing the polymerization with one of the many substances, for example benzoyl peroxide, known to be effective for this purpose. The vinyl compound used in making the resin may be one of the easily-prepared esters, such as vinyl acetate or vinyl chloride. Among the many suitable solvents in which the polymerization may be conducted are toluene and acetone. The resin can be recovered in solid form by evaporating the solvent, or a concentrated solution may be made by evaporating a part of the solvent. To such concentrated solution there may be added appropriate diluents which do not precipitate the resin, thus producing a lacquer base.

The various vinyl resins have certain properties in common, but differ specifically depending upon the vinyl compounds from which they are made, and upon other circumstances. Thus vinyl acetate gives a resin having good adhesive and cohesive properties, and being comparatively readily soluble and fusible. Vinyl chloride forms a resin which is harder, less soluble, and less fusible, but which tends to be friable. By conjointly polymerizing (by which is meant polymerizing in mutual contact) mixtures of vinyl chloride and vinyl acetate, resins of particularly valuable properties are formed. These resins give excellent lacquers, and are also useful in thermoplastic and other compositions. It is noteworthy that resins identical with those prepared by conjoint polymerization cannot be made by separately polymerizing the single vinyl compounds, and thereafter mixing the products so obtained.

After a vinyl compound is polymerized in solution, the resin may be precipitated by diluting the solution with an appropriate substance, for example methyl, ethyl or isopropyl alcohol, or mixtures of alcohols, or mixtures of alcohols with water. The properties of the resin do not appear to be much affected by precipitating it in this fashion. If collected and dried, it exhibits about the same solubility and fusibility as if it had been recovered in solid form by evaporating the solvent in which it was produced.

The present invention comprises a process whereby vinyl resins may be rendered less soluble and fusible, and it comprises the precipitation of the resins from solution by alcoholic liquids and the like in the presence of alkaline substances.

The invention may take many different forms with respect to the vinyl compound polymerized, the solvent in which the polymerization is carried out, the concentration of the resulting resin solution, the precipitant used to throw down the resin, and the alkaline substance used to modify the resin. In general, the resins made by the conjoint polymerization of two or more vinyl compounds, and particularly the chloride and acetate, are most useful when modified in accordance with the present invention. The resins are most completely changed, that is, their solubility and fusibility are most diminished, when they are precipitated under strongly alkaline conditions, and if a very high-melting material is desired, we prefer to use such strong bases as the alkali metal hydroxides. Using ethyl alcohol as the precipitant, about 0.5% to 1.0% of caustic soda (based on the resin) will in many cases give resins which are still soluble, but which are improved because of their raised softening points, while 3% to 10% of caustic soda will, under many conditions, yield resins which are practically insoluble in toluene and other solvents, but which are nevertheless very useful as thermoplastic substances. With resins produced by the conjoint polymerization of vinyl acetate and vinyl chloride, less alkali is required to destroy the solubility as the proportion of the chloride in the original mixture increases. The alkali metal hydroxides may be replaced with many other alkaline substances, for example ammonia, sodium carbonate, ethanolamines, and other amines. Such weaker bases act more slowly, or produce less modification of the resin.

The invention is further illustrated by the following specific example:

Five hundred pounds of an acetone solution containing 250 pounds of vinyl resin is added slowly to 250 pounds of a mixture containing equal parts by volume of ethyl and isopropyl alcohol together with 1.0% of caustic soda. The mixture is stirred vigorously and 500 pounds of water is added. The resin is separated from the liquid by filtration through a cloth, and is thoroughly washed with water. The resin is then spread on pans and dried in an air oven.

I claim:—

1. Process of diminishing the fusibility and solubility of a polymerized vinyl ester resin which comprises precipitating the resin from solution and subjecting it at the moment of precipitation to the action of a quantity of a water-soluble basic compound insufficient to cause appreciable hydrolysis of said resin under the conditions of precipitation.

2. Process of diminishing the fusibility and solubility of a polymerized vinyl ester resin which comprises precipitating the resin from solution with a quantity of an alkaline alcoholic compound insufficient to hydrolyze appreciably said resin under the conditions of precipitation.

3. Process of diminishing the fusibility and solubility of a resin produced by the conjoint polymerization of vinyl acetate and vinyl chloride, which comprises precipitating the resin from solution with an alcoholic precipitant, and simultaneously treating the resin with 0.5% to 3% of its weight of alkali metal base.

4. Process of diminishing the fusibility and solubility of a polymerized vinyl ester resin which comprises precipitating the resin from solution by addition of a non-solvent for the resin, and subjecting said resin at the moment of precipitation to the action of a quantity of water-soluble basic compound insufficient to hydrolyze appreciably said resin under the conditions of precipitation.

FOSTER ROBERTSON.